(12) United States Patent
Stephan et al.

(10) Patent No.: US 12,041,489 B2
(45) Date of Patent: Jul. 16, 2024

(54) METHOD FOR PRE-EMPTING TRANSMISSION RESOURCES FOR REAL-TIME DATA ROUTING

(71) Applicant: ORANGE, Issy-les-Moulineaux (FR)

(72) Inventors: Emile Stephan, Chatillon (FR); Veronica Karina Quintuna Rodriguez, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 460 days.

(21) Appl. No.: 17/297,788

(22) PCT Filed: Nov. 14, 2019

(86) PCT No.: PCT/FR2019/052713
§ 371 (c)(1),
(2) Date: May 27, 2021

(87) PCT Pub. No.: WO2020/109694
PCT Pub. Date: Jun. 4, 2020

(65) Prior Publication Data
US 2022/0030468 A1     Jan. 27, 2022

(30) Foreign Application Priority Data

Nov. 28, 2018 (FR) ..................... 1871998

(51) Int. Cl.
*H04W 28/20* (2009.01)
*H04W 48/12* (2009.01)
(Continued)

(52) U.S. Cl.
CPC ........... *H04W 28/20* (2013.01); *H04W 48/12* (2013.01); *H04W 48/16* (2013.01); *H04W 72/0453* (2013.01); *H04W 72/51* (2023.01)

(58) Field of Classification Search
CPC ..... H04W 28/20; H04W 48/12; H04W 48/16; H04W 72/0453; H04W 72/048; H04W 72/51; H04W 72/512
See application file for complete search history.

(56) References Cited

U.S. PATENT DOCUMENTS

2019/0357122 A1* 11/2019 Li ..................... H04W 76/27
2020/0112391 A1* 4/2020 Yang .................. H04W 72/569

OTHER PUBLICATIONS

Fujitsu ("Resource Allocation for NR V2X Sidelink Communication", 3GPP TSG RAN WG1 Meeting #95, R1-1812410, Nov. 12-16, 2018) (Year: 2018).*

(Continued)

*Primary Examiner* — Chi H Pham
*Assistant Examiner* — Ji-Hae Yea
(74) *Attorney, Agent, or Firm* — David D. Brush; Westman, Champlin & Koehler, P.A.

(57) ABSTRACT

A method for allocating at least one transmission resource from among a plurality of resources, intended for routing a first item of data relating to a first application in a communication infrastructure. The method is implemented in a distributed management entity for managing the plurality of resources and includes: receiving, from a centralized management entity, an allocation message for allocating a plurality of resources having a set of transmission features for a second item of data relating to a second application; and assigning at least one resource of the plurality to the transmission of the first item of data. The method furthermore includes selecting a feature of the set for the transmission of the second item of data on the resources of the plurality that are not assigned to the transmission of the first item of data.

14 Claims, 4 Drawing Sheets

(51) Int. Cl.
*H04W 48/16* (2009.01)
*H04W 72/0453* (2023.01)
*H04W 72/51* (2023.01)

(56) References Cited

OTHER PUBLICATIONS

62743511, Specification, Oct. 9, 2018 (Year: 2018).*
62743511, Drawings-only_black_and_white_line_drawings, Oct. 9, 2018 (Year: 2018).*
"Information technology—Dynamic adaptive streaming over HTTP (DASH)—Part 1: Media presentation description and segment formats", International Standard, Reference No. ISO/IEC 23009-1:2014(E), Second edition, May 15, 2014.
English translation of the Written Opinion of the International Searching Authority dated May 25, 2021 for corresponding International Application No. PCT/FR2019/052713, filed Nov. 14, 2019.
Fujitsu, "Resource Allocation for NR V2X Sidelink Communication", vol. RAN WG1, No. Spokane, United States; Nov. 12, 2018-Nov. 16, 2018, Nov. 11, 2018 (Nov. 11, 2018), 3GPP Draft; R1-1812410 Resource Allocation for NR V2X Sidelink Communication_Final, 3rd Generation Partnership Project (3GPP), Mobile Competence Centre ; 650, Route Des Lucioles ; F-06921 Sophia-Antip, XP051554326.
"3rd Generation Partnership Project; Technical Specification Group Radio Access Network; NG-RAN; F1 application protocol (F1AP) (Release 15)", Sep. 25, 2018 (Sep. 25, 2018), 3GPP Draft; DRAFT_38473-F30_V2, 3rd Generation Partnership Project (3GPP), Mobile Competence Centre ; 650, Route Des Lucioles ; F-06921 Sophia-Antipolis Cedex ; France, XP051526722.
International Search Report dated Feb. 25, 2020 for corresponding International Application No. PCT/FR2019/052713, Nov. 14, 2019.
Written Opinion of the International Searching Authority dated Feb. 25, 2020 for corresponding International Application No. PCT/FR2019/052713, filed Nov. 14, 2019.

* cited by examiner

METHOD FOR PRE-EMPTING TRANSMISSION RESOURCES FOR REAL-TIME DATA ROUTING

CROSS-REFERENCE TO RELATED APPLICATIONS

This Application is a Section 371 National Stage Application of International Application No. PCT/FR2019/052713, filed Nov. 14, 2019, which is incorporated by reference in its entirety and published as WO 2020/109694 A1 on Jun. 4, 2020, not in English.

1. TECHNICAL FIELD

The application for invention lies in an architecture of a mobile network in which the transmission functions are implemented in separate entities of the network. The invention aims to allow an application requiring rapid availability of transmission resources in order to route data relating to this application to pre-empt resources that are initially allocated to another application.

2. PRIOR ART

Traditional cellular networks, or radio access networks (RAN), consist of a large number of autonomous base stations (BTS, base transceiver stations). Each BTS covers a small region, whereas a group of BTS provides coverage over a continuous region. Each BTS processes and transmits its own signal to and from the mobile terminal, and routes the data between the mobile terminal and the communications network of an operator. An access station, called BTS here, may also be a NodeB station, an eNodeB station or an access station deployed for future generation networks, and in particular what are known as 5G (fifth generation) networks.

Figure 1:
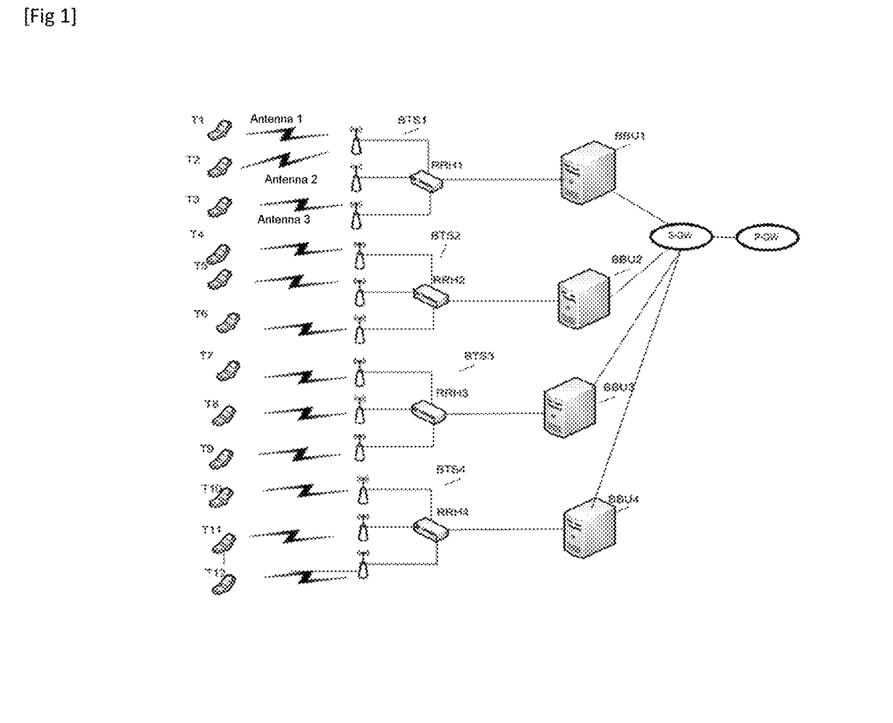
FIG. 1 shows a simplified view of a network architecture in which the invention is implemented, according to one aspect of the invention.

More recently, a distributed base station architecture has been introduced by telecommunications hardware suppliers. FIG. 1 shows one example of such an architecture. In this architecture, the radio function unit, also called remote radio head (RRH), is connected to the digital functional unit, or baseband unit (BBU), for example via a fiber. The RRH may be installed at the top of the tower close to the antenna, reducing transmission losses. The fiber link between RRH and BBU also allows greater flexibility in terms of network scheduling and deployment. The BBU allocates radio resources to the terminals attached to the corresponding RRH using a scheduling algorithm specific to the policy of the operator managing the infrastructure. Thus, in FIG. 1, the BBU1 allocates radio resources, for example resource blocks (RB) identifying transmission frequencies during time intervals, to the terminals T1, T2, T3 respectively attached to the antennas 1, 2, 3 of the RRH1.

Figure 2:
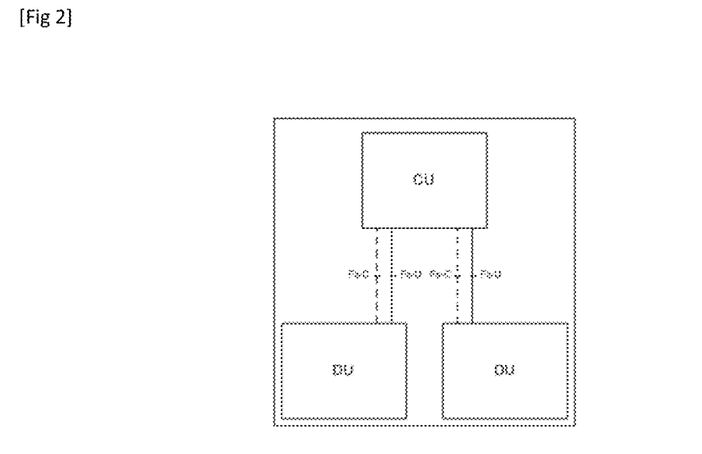
FIG. 2 shows another view of a network architecture according to another aspect of the invention.

The majority of modern base stations nowadays use this decoupled architecture. Hereinafter, a distinction will be drawn, in mobile network architectures, between distributed units (DU) and centralized units (CU), as shown in FIG. 2. In particular, an RRH is thus called DU and a BBU is a CU. The distribution of the elementary functions implemented respectively in a DU and in a CU is still under discussion. It is likely that a DU will support radio transmission and reception functions, such as analog-to-digital conversion and signal amplification as well as modulation. A CU may combine, inter alia, signal processing (coding) and radio scheduling functions using a certain algorithm. In initial deployments, the coding function is more often than not implemented in a DU. A DU is always located next to the antennas, whereas the CU is located higher in the network, toward the core network equipment. In the evolution of mobile network architectures, it is being contemplated to deploy pools of CUs, and reference is then made to a C-RAN (Centralized-Radio Access Networks) architecture, or even a Cloud-RAN architecture when the CUs are implemented in cloud storage spaces. The CUs share computing resources as well as access network information for more effective use of the radio resources (reduction of interference, CoMP (Coordinated Multipoint) for transmitting a data stream via multiple stations, etc.).

The communication interface between the CU and DU entities is not yet defined. This interface is called Fs in the specification works of fifth generation networks, an Fs-U channel of this interface being intended to route user data and an Fs-C channel of the interface being intended to route control data. Several options are currently under discussion for implementing this interface, such as for example the eCPRI (Enhanced Common Public Radio Interface) interface, which is the advanced version of the CPRI currently deployed in 4G between the RRH and the BBU. The IEEE (Institute of Electrical and Electronics Engineers), for example, also proposes an interface for transmitting radio signals directly over Ethernet (IEEE 1914.3).

According to the prior art, in which the coding function is implemented in the CU, the CU takes on a data encoding function, that is to say that it selects a modulation and coding type for the transmission of data from an application of a user terminal and it indicates to a DU the modulation and coding type to be used, at which time and on which frequency, that is to say on which resources. The CU thus constructs a scheduling table, comprising RBs (Resource Blocks), that is communicated to each DU. The RB corresponds to an elementary frequency band (the channel) allocated to a terminal in an elementary time slot TS, and each RB is given an associated power and modulation and coding scheme (MCS). This MCS information indicates a modulation and coding type allocated to a terminal. This may be for example BPSK, QPSK, 16QAM or 64QAM modulation. The CU therefore decides on an MCS for a given terminal and possibly for a data stream relating to an application of the terminal. The scheduling table is communicated to the DU for the actual transmission of the data to the terminal or from the terminal over the radio link.

This distribution of functions between the DU and the CU, and the latency problems on the link between a CU, or a pool of CUs, and the DU do not allow urgent data to be sent to terminals. Specifically, a CU specifically has to be able to receive the data from the application, process them, formulate or update a scheduling table using a scheduling algorithm indicated above and transmit the updated scheduling table or the new scheduling table to a DU so as to take into account the transmission of the urgent data, thereby possibly resulting in a delay that is incompatible with the needs of the application.

The present invention aims to provide improvements with respect to the prior art.

3. DISCLOSURE OF THE INVENTION

The invention improves the situation by way of a method for allocating at least one transmission resource from among a plurality of resources, intended for the routing of a first item of data relating to a first application in a communication infrastructure, the method being implemented in a distributed management entity for managing the plurality of resources, and comprising:

A step of receiving, from a centralized management entity, an allocation message for allocating a plurality of resources comprising a set of transmission features for a second item of data relating to a second application, A step of assigning at least one resource of the plurality to the transmission of the first item of data, A step of selecting a feature of the set for the transmission of the second item of data on the resources of the plurality that are not assigned to the transmission of the first item of data.

According to the prior art, a DU entity receives a scheduling table comprising resources to be allocated for the transmission of data from an application and an item of information about the modulation and coding features to be used for the transmission of these data. The DU, according to the prior art, does not have the option of acting on the table, and allocates the resources in accordance with the table received from a centralized management entity, such as a CU.

The invention aims to allow the DU to be able to modify an instruction received from the CU, in agreement with the CU. The CU, rather than indicating a single modulation feature, indicates to the DU that data from an application may be transmitted using one of the transmission features, such as transmitted modulation and coding features. For a given application, the CU indicates multiple transmission features, leaving the DU the option of opting for one of these features on the basis of constraints linked to the sending of data from another application that it has to transmit urgently. The method thus allows the DU to pre-empt resources that are initially allocated to one application for the transmission of data from another application, while at the same time guaranteeing that the data from the two applications are actually transmitted. This pre-emption is specifically accompanied by a selection of one of the transmission features from among those received, this transmission feature being selected in order to allow the data from the two applications to be transmitted via sharing of the resources initially allocated only to a single application.

According to one aspect of the invention, in the allocation method, a resource comprises a frequency band and a duration.

The option of modifying the allocation of transport blocks corresponding to a set of resource blocks (frequency bands and duration) indicated by the CU requires the DU to select a transmission feature (for example an MCS code) suitable for the new distribution of the resources between the two items of data.

According to one aspect of the invention, in the allocation method, a resource comprises a wavelength.

In the case of a Li-Fi (Light Fidelity) network, the plurality of resources corresponds to a wavelength or to a set of wavelengths, these being able to be allocated for a limited duration.

According to another aspect of the invention, the allocation method furthermore comprises a step of the distributed management entity obtaining a message comprising a parameter that triggers the assignment step.

The assignment by the distributed management entity is possibly triggered on the basis of parameters. An operator may thus decide not to give a distributed entity the option of modifying an initial allocation, impacting the routing quality of the data from the second application, unless the DU obtains a message containing a particular parameter. This parameter may be linked to the criticality of the first application, to the quality of service required for the routing of data from the first application, or any other parameter.

According to another aspect of the invention, in the allocation method, the parameter is obtained from a terminal.

A terminal of a user may thus make it possible, under the control of the DU, to pre-empt transmission resources and thus allow urgent data relating to an incident in a geographical region to be routed as a priority over less urgent applications for which these pre-empted resources had initially been allocated.

According to another aspect of the invention, the allocation method furthermore comprises, prior to the assignment step, a step of selecting a modulation and coding feature for the transmission of the second item of data.

The prior art does not make provision to send a plurality of data transmission features of an application. On the other hand, according to the invention, the distributed entity may decide to select one of the features for the transmission of the data from the second application, this then being able to be modified if data from another application have to be transmitted urgently.

According to another aspect of the invention, in the allocation method, the set of received features furthermore comprises at least one item of priority information associated with at least one feature.

An item of priority information associated with a transmission feature, for example a modulation and coding feature, allows a CU responsible for transmitting the features to recommend one feature over another when the DU selects a feature once a transmission resource has been assigned to another application, but also prior to the assignment when a selection takes place before the assignment.

According to another aspect of the invention, the allocation method furthermore comprises a step of transmitting, to the centralized entity, a notification message comprising an indication about the first item of data.

If the first item of data from the first application corresponds to an application that may last over time, the DU may advantageously inform the CU about this application such that the latter is able to take this application into account for the future allocation of transmission resources. This notification message thus allows the CU to keep control over the allocated resources and to take into account interactions with applications over which the DU does not have control.

According to another aspect of the invention, in the allocation method, the notification message comprises a forecast of resources for the transmission of the first item of data.

The distributed entity may advantageously transmit, to the centralized entity, a forecast of resources required for the transmission of the data from the first application so that the centralized entity is able to select the resources and the transmission features adapted to this forecast.

According to another aspect of the invention, in the allocation method, the allocation message is received over a connection that multiplexes the user data, control and resource synchronization channels.

Using for example an eCPRI or IEEE 1914.x link to transmit the allocation message makes it possible to take advantage of the functional richness of this interface and in particular of the various transmission channels (user plane, control plane, synchronization plane). Other options are possible, such as for example MPLS (Multiprotocol Label Switching) and VLAN (Virtualized Local Area Network) links.

According to another aspect of the invention, in the allocation method, the allocation message furthermore comprises an item of information about a network slice, called slice, associated with the plurality of resources.

In particular in future generations of networks (5G), services (applications, terminals, service classes, etc.) are associated with network slices implemented by an operator. A network slice corresponds to a set of (elementary) functions made available for routing and processing data relating to a service (in the broad sense (terminal, application, field)) and, according to the invention, for which transmission resources, such as transport blocks, are allocated. The resources are advantageously associated with network slices, thus making it possible to be able to act on resources belonging to a slice or else, depending on the implementation, on the distribution of resources between network slices, for example in order to increase the resources of a slice associated with real-time data.

The various aspects of the allocation method that have just been described may be implemented independently of one another or in combination with one another.

The invention also relates to a device for allocating at least one transmission resource from among a plurality of resources, intended for the routing of a first item of data relating to a first application in a communication infrastructure, comprising:
  A receiver, able to receive, from a centralized management entity, an allocation message for allocating a plurality of resources comprising a set of transmission features for a second item of data relating to a second application,
  An assignment module, able to assign at least one resource of the plurality to the transmission of the first item of data,
  A selection module, able to select a feature of the set for the transmission of the second item of data on the resources of the plurality that are not assigned to the transmission of the first item of data.

This device, which is able, in all of its embodiments, to implement the allocation method that has just been described, is intended to be implemented in a management equipment of a network dynamically allocating transmission resources to data streams. This may for example be a radio access station (eNodeB, 5G access station, etc.), an RRH equipment or even a decentralized BBU equipment.

The invention also relates to a system for allocating at least one transmission resource from among a plurality of resources, intended for the routing of a first item of data relating to a first application in a communication infrastructure, comprising:
  a distributed management entity comprising an allocation device,
  a centralized management entity comprising:
  an assignment module, able to assign a plurality of resources comprising a set of transmission features to the transmission of the second item of data,
  a transmitter, able to transmit, to the distributed management entity, an allocation message for allocating a plurality of resources comprising a set of transmission features for the second item of data relating to the second application.

The invention also relates to a computer program comprising instructions for implementing the steps of the allocation method that has just been described when this program is executed by a processor.

This program may use any programming language and be in the form of source code, object code or intermediate code between source code and object code, such as in a partially compiled form, or in any other desirable form.

The invention also targets a computer-readable information medium comprising instructions of the computer program as mentioned above.

The information medium may be any entity or device capable of storing the programs. For example, the medium may include a storage means, such as a ROM, for example a CD-ROM or a microelectronic circuit ROM, or else a magnetic recording means, or a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit in which the program is incorporated, the circuit being designed to execute or to be used in the execution of the method in question.

4. BRIEF DESCRIPTION OF THE DRAWINGS

Other advantages and features of the invention will become more clearly apparent from reading the following description of one particular embodiment of the invention, given by way of simple illustrative and non-limiting example, and the appended drawings, in which.

5. DESCRIPTION OF THE EMBODIMENTS

The remainder of the description presents examples of several embodiments of the invention in a mobile communication infrastructure. The invention may be implemented in any type of infrastructure in which transmission resources are dynamically allocated to terminals so that they transmit or receive data to or from a remote entity.

Figure 3:
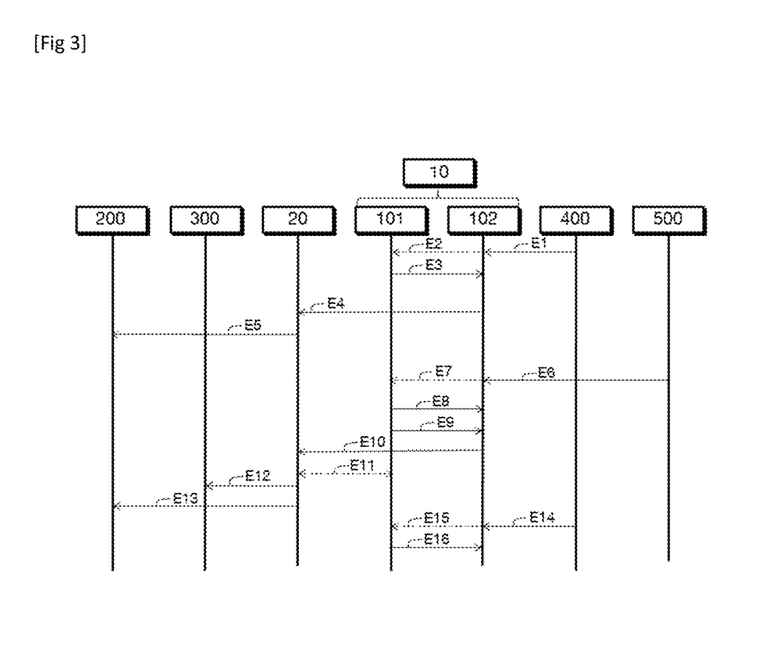
FIG. 3 shows an overview of the allocation of resources according to the prior art.

Reference is made first of all to FIG. 3, which shows an overview of the allocation of resources according to the prior art.

In this FIG. 3, the CU entity 10, which is for example a BBU, consists of an encoder 102 responsible for encoding the data in accordance with a selected modulation and encoding type, and of an entity 101 for scheduling the transmission resources allocated to a given terminal.

In step E1, an HTTP (HyperText Transfer Protocol) application server 400 transmits an item of content to the terminal 200, the latter having transmitted a request to obtain the item of content to the server 400 beforehand, this request being not shown in FIG. 3. Upon reception of the item of content, the encoder 102 of the CU entity 10, in step E2, transmits to the scheduling entity 101 a request to obtain a modulation and encoding type as well as transmission resources for sending the data transmitted by the server 400. Since the scheduling entity 101 has significant transmission resources for these data, it responds in step E3 by indicating the 256QAM modulation type for encoding the data transmitted by the server 400, and it indicates the resources to be used for these data. The 256QAM modulation type allows the terminal 200 to benefit from a good data rate for the data transmitted by the server 400. In step E4, the encoder transmits the data received from the server 400 to the DU entity 20, which may be an RRH entity. The DU entity 20 then transmits the data to the terminal 200 via an access station, possibly collocated with the DU entity 20. The access station, depending on the radio technology used to transmit the data to the terminal 200, may be a BTS station, a NodeB station, an eNodeB station or else an access station of a fifth generation or subsequent generation radio network. The data are transmitted by the DU entity 20 to the terminal 400 using the resources allocated by the CU entity 10 and using the modulation and coding type selected by the scheduling entity 101.

In step E6, the real-time data server 500, such as for example a weather alert server, transmits data to be transmitted to the terminal 300, which has subscribed for example to the weather alert service. The encoder 102 receives the data from the server 500 and has to transmit them without a delay to the terminal 300. It then calls on the scheduling entity 101, in step E7, in order to obtain transmission resources and a modulation and coding type for these real-time data. The scheduling entity 101 decides to select another modulation type for the data received from the server 400, so as to be able to allocate resources and a modulation and coding type for the real-time data received from the server 500. In step E8, the entity 101 determines and transmits the 16QAM modulation type for the data from the server 400 to be transmitted to the terminal 200 as well as a smaller number of resources in comparison with the resources allocated in step E3. In step E9, it determines and transmits the QPSK modulation type and some resources initially allocated to the data transmitted by the server 400 for the data from the server 500 to be transmitted to the terminal 300.

The encoder 102, in step E10, transmits the data received from the server 400 as well as the data received from the server 500 to the DU entity, indicating the resources as well as the modulation and coding types relating to these two data types. These transmissions may be performed in two separate steps.

Step E11 does not show sending of a message, but indicates the latency firstly for allocating resources initially allocated to the server 400 for the real-time data and for selecting another modulation type for the data from the HTTP server 400, this allocation and this selection being made necessary in order to be able to route the real-time data.

In step E12, the DU entity 20 transmits the real-time data to the terminal 300, but the choice of the inefficient modulation type made by the scheduling entity 101 and the conditions or the quality of radio reception for the terminal 300 lead to data decoding that is made challenging or even impossible for the terminal 300.

In step E13, the terminal 200 continues to receive the data, but with a 16QAM modulation type, therefore with a lower data rate than beforehand, when the 256QAM type was being used. This data rate is therefore no longer adapted to the volume of data transmitted by the server, which has to adjust its sending volume in order to avoid data losses and a drop in quality.

In step E14, all of the real-time data have been routed by the server 500 to the terminal 300, and it is then possible for the scheduling entity to again select the 256QAM modulation type for the data transmitted by the server 400 to the terminal 200. The server 400 will be able, after a few seconds, to adapt its transmitted data volume to the higher data rate allowed by the new modulation type.

This prior art therefore exhibits at least two problems. The condition of taking into account the constraints of the real-time data is not satisfied through the choice of a modulation type and distribution of the transmission resources by the scheduling entity 101. Specifically, the centralized CU entity 10 has no knowledge about the radio conditions, and communicating the allocated resources and the modulation type requires a transmission delay between the CU entity 10 and DU entity 20. Moreover, the modifications of HTTP traffic modulation type, in order to allow the transmission of real-time data on shared radio resources in order to transmit the two data types (real-time and HTTP), leads to a worsening of the quality of service for the terminal 200. The server 400 specifically has to slave the sending of the data to the data rate to the terminal 200, this change in data rate being observed by the server 400 after a certain delay.

The purpose of FIG. 3 is to show the problems posed by the prior art and to better understand the allocation method in its various embodiments.

Figure 4:
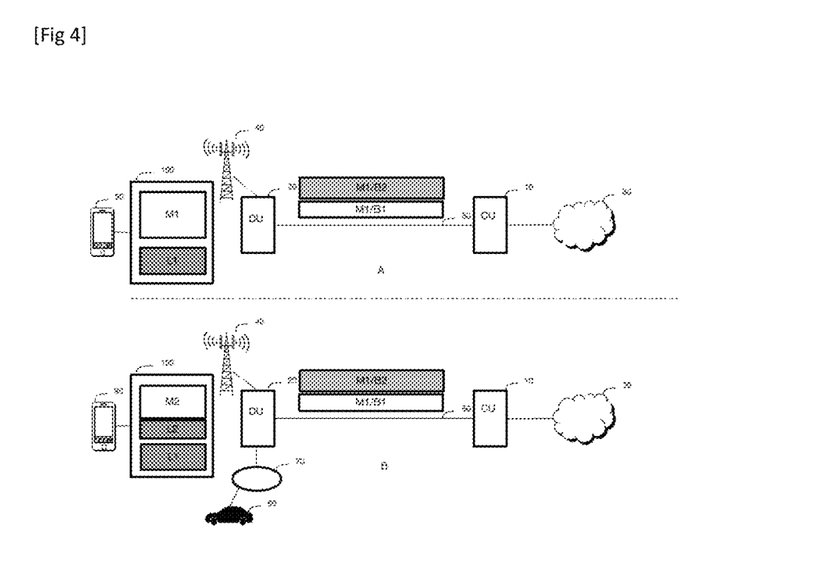
FIG. 4 shows an overview of the allocation method according to a first embodiment of the invention.

Reference is then made to FIG. 4, which shows an overview of the allocation method according to a first embodiment of the invention.

In this FIG. 4, a CU entity 10 allocates transmission resources and transmission features to terminals so that these send and receive data. These resources consist of frequency bands (or channels) during time intervals, and the transmission features correspond to coding and modulation schemes, for example represented by the MCS (Modulation and Coding Systems) feature. A resource comprises a transmission feature according to the prior art. One and the same terminal 90 may be allocated several frequency bands (or resource blocks) during several time intervals, this corresponding to a transport block (a set of RBs). According to the prior art, the CU entity 10 transmits only one modulation scheme for the terminal 90, or even for a specific application of the terminal 90 for a given resource. In order to assign a modulation scheme to the terminal 90 attached to the access station 40, the CU entity 10 communicates a scheduling table comprising the various "resource blocks" and the associated MCS codes allocated to the various terminals attached to the access station 40. This table is communicated to the DU entity 20, providing functions relating to the transmission of the data over the cellular radio network. A CU entity 10 may transmit tables to several DU entities, and the DU entity 20 may itself manage a set of access stations. FIG. 3 shows only one of each of the CU entity 10, DU entity 20 and access station entity 40 for the sake of clarity.

The CU entity 10 is connected to a network 30. This network 30 is for example connected to the Internet and thus allows the terminals attached to the access station 40, including the terminal 90, to be able to access services and communicate with fixed or mobile correspondents. The CU entity 10 and the DU entity 20 are interconnected via a link 50 that may for example be an optical fiber, but it may be a network, for example an IP (Internet Protocol) or MPLS (Multi Protocol Label Switching) network.

According to one example of the invention, the terminal 90 attached to the access station 40 wishes to download video data in streaming mode. The CU entity 10 therefore has to allocate transmission resources and transmission features to this terminal 90 for the duration of downloading of the data. This allocation takes into account the other terminals attached to the access station 40, or even to other access stations connected to the DU entity 20, in order to establish its scheduling table. In the example, the CU entity 10 decides to select two transmission features B1 and B2 for the resource M1 for the terminal 90. The feature B1 relating to the resource M1 is denoted M1/B1. It should be noted that, according to the prior art, only one feature is associated with a resource block, with a terminal or with an application of the terminal.

According to one example of the invention, the CU entity 10 allocates transmission resources for the video streaming application. In this case, it chooses two features, that is to say two coding and modulation types. For example, it is considered that the CU 10 selects MCS QPSK (Quadrature Phase-Shift Keying), corresponding to M1/B1 in the figure, and 16QAM (16-Quadrature Amplitude Modulation), corresponding to M1/B2.

According to one example, information about a network slice associated with the resources. In particular, in the case of a video streaming application, the CU entity 10 may indicate "Video" for the allocated resources, thus indicating to the DU that the allocated resources are associated with a "Video" slice. The DU entity 20 may thus use this slice information to manage the data and apply policies specific to the slices and to the data associated with these slices. In particular, the DU entity 20 may use this information to then assign resources, which are initially associated with a "Video" slice, to "Real-Time" data, corresponding to another slice, and to be transmitted more urgently than the video data.

In case A in FIG. 3, the DU entity 20 selects the most efficient coding and modulation scheme, specifically M1/B2, to transmit the data to the terminal 90. From among the set 100 of available radio resources, a significant number of these resources may be allocated to the streaming stream of the video application corresponding to M1 in the figure, and the MCS 16-QAM code may be chosen, since the resources available for the video streaming data are significant. It should be noted that, in case A, some resources L1 are allocated to streams of real-time applications, for example for a telephony service. These resources L1 may be allocated by the CU entity 10. The set of transmission resources of the station 40 are the resources 100 corresponding to M1+L1.

In case B, an untimely event occurs. In this case, this is a road incident requiring information to be broadcast to terminals that are geographically present in the region, including the terminal 90, where the road incident occurred, some of these terminals being attached to the access station 40. In this case, the transmission resources from among the set M1 of resources allocated to the streaming streams must be allocated, as a priority and quickly, to this untimely event. This new distribution of the resources between the data streams of the video streaming application and the data streams relating to the road incident is managed by the DU entity 20, since a new scheduling table established by the CU entity 10 would take too long and would not be compatible with the real-time need for information linked to the road incident, or even with the propagation conditions detected by the DU entity 20. The DU entity 20 receives information from a road traffic management application server 70, which has itself obtained an item of information from a vehicle 80 at the road incident. The DU entity 20 decides to allocate more transmission resources, that is to say more resource blocks, to the road traffic management application. The DU entity 20 should also reduce the resources M1 allocated to the video streaming application. This reduction of resources for the video streaming application is also accompanied by a change in MCS code from among the codes previously received from the CU entity 10. In the knowledge that there are fewer resources M2 than there are resources M1, the DU entity 20 selects a less efficient MCS code. In this case, it opts for the MCS QPSK code (M1/B1) received from the CU entity 10. It should be noted that the data streams of the streaming application and of the road traffic management application may be respectively routed to the terminal 90 on network slices adapted to the features of the data streams.

Figure 5:
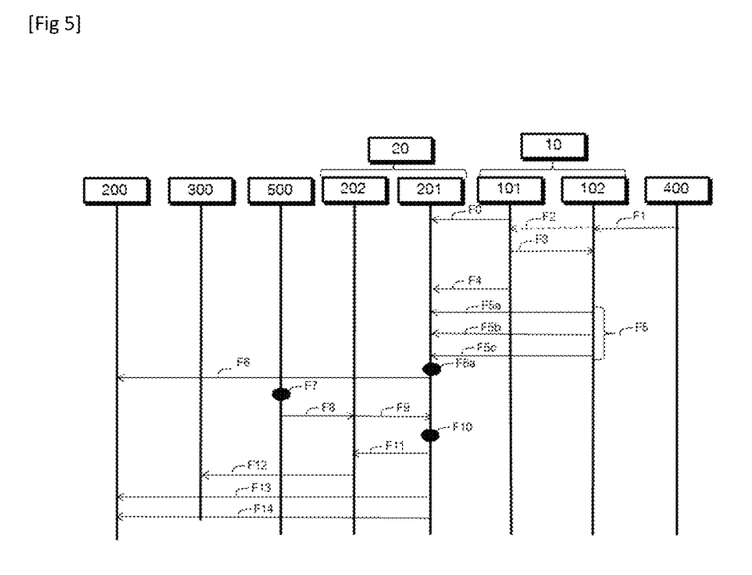
FIG. 5 shows an overview of the allocation method according to a second embodiment of the invention.

Reference is now made to FIG. 5, which shows an overview of the allocation method according to a second embodiment of the invention.

The entities in FIG. 5 are identical to FIG. 3, except that the distributed DU entity 20 is specified and comprises a real-time data encoder 202 as well as a scheduling entity 201. According to one example, the server 500 may also be integrated into the DU entity 20, for example if the server 500 is a MEC (Mobile Edge Computing) server.

According to one example, in step F0, the scheduling entity 101 transmits a message comprising a parameter that triggers the assignment of a transmission resource, initially assigned by the CU entity 10, by the DU entity 20. This parameter authorizes or does not authorize the DU entity 20 to pre-empt the resources allocated by the CU entity 10. This parameter may be associated with specific data or for all of the data transmitted by the CU entity 10 to the DU entity 20.

Steps F1 to F3 are equivalent to steps E1 to E3 in FIG. 3.

In step F4, the CU entity 10 and, more specifically, the scheduling entity 101 of the CU entity 10 transmits, to the scheduling entity 201 of the DU entity 20, the resources allocated for the data transmitted by the server 400, as well as the various possible encoding types for the data from the HTTP broadband service made available by the server 400. These encoding types are for example transmitted in a UserDataChoice message on the CM (Control and Management) channel of an eCPRI link.

The information transmitted by the entity 101 to the entity 201 is for example the following:

```
UserDataChoice: [
    { //~20Mbps
    MCS_index:3, // S/N < 9
    Number_Resource_Block:30,
    user_id: 200},
    { //~50Mbps
    MCS_index:15, // S/N < 9
    Number_Resource_Block:80,
    user_id: 200},
    { // 4k : ~100Mbps :
    MCS_index: 27, // S/N < 20
    Number_Resource_Block:100,
    user_id: 200}]
```

The MCS code corresponds to the encoding type, the information corresponds to the signal-to-noise level of the radio transmission channel and the Number_Resource_Block corresponds to the resources allocated for the "broadband" data transmitted by the server 400 for the terminal 200.

The scheduling entity 201 identifies the HTTP data transmitted by the server 400 and routed on the User Plane channel of the eCPRI link based on the encoding type (MCS code), on the number of resources and on the identifier of the terminal (200). If the data of the User Plane channel are transported over the QUIC (Quick UDP Internet Connections) protocol, each alternative described in the UserDataChoice message additionally includes a QUIC stream number. The DU entity 20 chooses the modulation and coding feature adapted to the constraints of the radio conditions for the transmission of the data to the terminal 200. According to one alternative, each modulation and coding (MCS) feature comprises an item of information about a priority level associated with each feature. This information allows the CU entity 10 to keep control over the modulation and coding type used for the transmission of the data from the server 400.

The encoding alternatives may also be transmitted on the User Plane channel of the eCPRI link. The User Plane channel may then comprise multiple HTTP connections, and each connection contains a UserDataChoice field with an encoding type. The HTTP connections may alternatively be HTTP/2 streams or even QUIC protocol streams if this protocol is used. The UserDataChoice messages may thus be exchanged in PATH_CHALLENGE and PATH_RESPONSE frames of the QUIC protocol.

In step F5, the encoder 102 of the CU entity 10 transmits the HTTP content received from the server 400 and destined for the terminal 200 to the scheduling entity 201 of the DU entity 20. The encoder 102 encodes the content in line with several modulation types in accordance with the modulation types transmitted in the UserDataChoice message in step F4. According to this embodiment, the modulation types are QPSK, 16QAM and 256QAM and the streams encoded according to these types are transmitted in respective steps F5a, F5b and F5c. There is no limit with regard to the number and types of modulation transmitted.

In step F6, the DU entity 20 transmits the HTTP content to the terminal 200 by virtue of having selected, in step F6a, one modulation type from among the three received in step F5, on the basis of the radio constraints and the number of streams to be transmitted to the various terminals managed by the DU entity 20. It is considered in this example that the entity 201 selects the 256QAM modulation type and that the transmission resources used by the DU entity 20 are "transport blocks" corresponding to a group of "resource blocks" (RBs) communicated in step F4.

In step F7, the application server 500 receives an item of information to be retransmitted urgently and with the best possible quality to the terminal 300. This may be for example an item of information relating to an accident to be transmitted to a terminal 300 of a vehicle, this vehicle possibly being an emergency services vehicle. In step F8, the application server 500 transmits, to the encoder 202, the information data to be transmitted by the server 500 and with high urgency. These data may advantageously comprise a parameter indicating to the DU entity 20 that these data are urgent and should be transmitted with minimal delay to the terminal 300. This parameter may for example be a quality of service field of the protocol used to transport the data, or a specific header of the protocol, and the server 500 transmitting this parameter may also be a terminal, if for example a person is alerting other people in a given geographical region of a problem occurring in said region. In step F9, the encoder 202 calls on the scheduling entity 201 in order to obtain transmission resources and a modulation type for the traffic transmitted by the server 500. In step F10, the entity 201 pre-empts transmission resources that are initially allocated to the data transmitted by the server 400 and changes the modulation type initially selected for the data transmitted by the server 400. It chooses for example the QPSK type, which was another possible modulation type for the UserDataChoice message transmitted in step F4. It also selects a modulation type and allocates transmission resources for the data transmitted by the server 500. In step F11, the scheduling entity 201 transmits, to the encoder 202, the modulation type selected for the data transmitted by the server 500 as well as the allocated transmission resources.

In step F12, the encoder transmits the data from the server 500 to the terminal 300 using the modulation type transmitted by the entity 201 and on the transmission resources allocated by the entity 201.

In step F13, the scheduling entity 201 continues to transmit the data received from the server 400 to the terminal 200, but using the QPSK modulation type and on a smaller number of resources in comparison with step F6, some of the transmission resources initially allocated for the transmission of the data from the server 400 having been allocated to the urgent data to be transmitted from the server 500 to the terminal 300. In step F14, once all of the data from the server 500 have been transmitted to the terminal 300, the entity 20 may restore the 256QAM modulation type and allocate more resources to the HTTP data, some transmission radio resources having been released through the end of sending of the data from the server 500 to the terminal 300.

Figure 6:
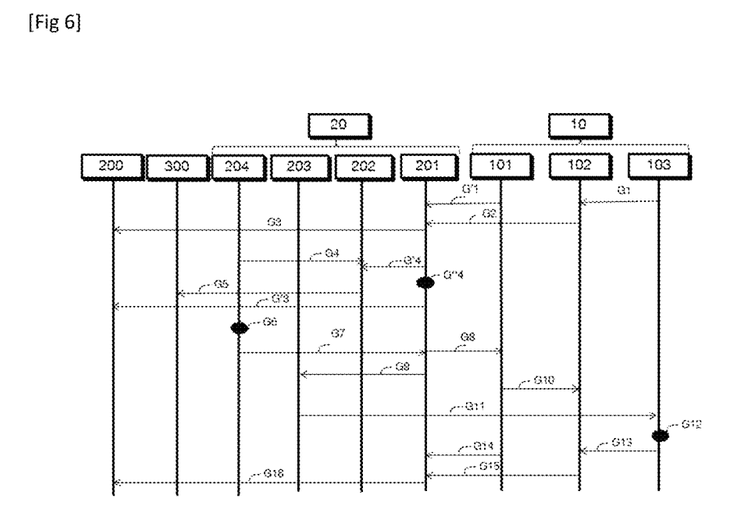
FIG. 6 shows an overview of the allocation method according to a third embodiment of the invention.

Reference is now made to FIG. 6, which shows an overview of the allocation method according to a third embodiment of the invention.

In this embodiment, the allocation method is implemented in an MPEG DASH (Moving Picture Experts Group-Dynamic Adaptive Streaming over HTTP) network architecture, described in document ISO/IEC 23009-1:2014. The CU entity 10 comprises, in addition to the encoder 102 and the scheduling entity 101, a SAND (Server and Network Assisted DASH) video streaming server. The DU entity 20, in addition to the encoder 202 and the scheduling entity 201, comprises a video streaming assistance entity 203 compatible with the MPEG DANE (Dash Assisting Network Element) standard. The DU entity 20 also comprises a real-time data application server 204, which may be a MEC (Multi-access Edge Computing) server.

A 5G terminal 200 is used by a person to view a video application. The data from the video application are routed on an eMBB network slice on the attachment radio network of the terminal 200. The video data are transmitted by the streaming server 103. The server 103 transmits the data to the encoder 102 in step G1.

The encoder 102, after having obtained resources and modulation and coding features from the entity 101 (steps not shown in FIG. 6), transmits, in step G2, the data to be transmitted to the terminal 200 to the scheduling entity 201 of the DU entity 20. It should be noted that step G2 may consist of several sub-steps in accordance with FIG. 5, depending on the protocol used for the transmission of the data. The scheduling entity 201 has obtained, from the scheduling entity 101, in step G'1, the resources and the transmission features relating to the video data. According to this example, in step G'1, the scheduling entity 101 sends the message eCPRI.userData.eMBB.UE200.data.encoding-16QAM-256QAM, indicating that the DU entity 20 may choose between the 16QAM or 256QAM feature for the transmission of the data to the terminal 200 on the eMBB slice. This message, also comprising the resources allocated for these video data, is transmitted on the eCPRI link. The scheduling entity 201 chooses the 256QAM feature and transmits the video data on the eMBB slice to the terminal 200 in step G3, using the resources allocated by the scheduling entity 101, via the entity 201. These data are therefore transmitted by the entity 201 to the terminal 200 on the resources allocated by the entity 101 and using the 256QAM transmission feature.

In step G4, the server 204 transmits real-time data, for example monitoring data for transport equipment of a communication network to be transmitted to the terminal 300. These data, received for example from various equipment by the server 204, should be transmitted on a uRLLC slice of the radio network. In step G5, the encoder 202 transmits the data to the terminal 300 on the uRLCC network slice using some of the resources allocated beforehand to the eMBB data. It will have obtained the modulation and encoding feature from the entity 201 beforehand, as well as the resources to be allocated to the transmission of these data in step G'4 after calling on (not shown) the entity 202. According to one alternative, it will have retained the information about the feature to be used on this network slice from a previous state. In step G"4, the entity 20, and more specifically the scheduling entity 201, determines another transmission feature, 16QAM, to be used for the sending of the eMBB data on the resources that are not pre-empted for the uRLCC data. These eMBB data are transmitted in step G'3 on resources that are not pre-empted for the sending of the uRLCC data and using the 16QAM transmission feature, and no longer the 256QAM feature used for the transmission of the previous video data (step G3).

The server 204 analyzes the data received from the transport equipment and deduces therefrom, in step G6, real-time traffic predictions. In step G7, it informs the scheduling entity 201 of these real-time traffic forecasts.

In step G8, the scheduling entity 201 communicates these forecasts to the scheduling entity 101 of the CU entity 10 by transmitting an eCPRI.CM.uRLLC.UE300 message: {period: 120, unit: 'seconds', type: 'sinusoidal', points [{8,7},{12,5},{76,7}]. This message, transmitted on the CM control channel of an eCPRI link, indicates that the real-time data to be transmitted on the uRLLC slice to the terminal 300 are sinusoidal, with an indication on a few points allowing the entity 101 to determine the reception variation of the data. This information is also transmitted to the video streaming assistance entity 203 of the DU entity 20 in step G9. The entity 101 then transmits, in step G10, a message comprising the 16QAM modulation and encoding feature to the encoder 102 for the data transmitted by the server 103.

In step G11, the video streaming assistance entity 203 transmits, to the MPEG SAND server 103, the forecasts received from the entity 201 in step G9, for example in a message on the User Plane channel of the eCPRI link or else on the CM (Control and Management) channel of the link. In step G12, the server 103 adapts the transmission of the video data to the forecasts received from the entity 203, for example by transmitting the video streaming data at a lower data rate. In step G13, the server 103 transmits the data at a low data rate to the encoder 102. The encoder 102, in step G15, transmits the data from the server 103 to the encoder 202, which then, in step G16, transmits the data via a radio access station to the terminal 200 using the transmission resources and the modulation and coding feature that are indicated by the scheduling entity 101 to the scheduling entity in step G14, this feature and these resources also having been communicated to the encoder 102 by the scheduling entity 101 (exchange not shown).

In this embodiment, the video streaming data modulation feature is adapted on the basis of the real-time data to be transmitted concurrently on shared radio resources. The streaming server furthermore itself adapts its transmission rate so as to avoid the impacts of viewing the video stream on the terminal 200 (interruption, "freezing", etc.) when the transmission rate is greater than the allocated resources and an overly efficient modulation and coding feature is used.

It should be noted that the allocation method may also be implemented in a Li-Fi network. According to one embodiment, one implementation of the method in such a Li-Fi network is formulated as follows:

A house contains a Li-Fi hub (corresponding to the CU entity) that is wired to Li-Fi transmitters. A person is watching a video on a tablet in a room and wavelength resources are allocated for viewing the video through the Li-Fi network. The tablet receives the video over the Li-Fi network in accordance with the allocated resources and the allocated modulation and coding code. A sensor (fire detector) in the room sends an event to the bulb hosting the Li-Fi transmitter (in this case, the bulb performs the role of a DU entity). Wavelength resources initially allocated to the video by the hub are dynamically allocated by the bulb to the data relating to the detection of the fire in accordance with the allocation method. In this embodiment, the resources are wavelengths rather than frequency bands.

Figure 7:
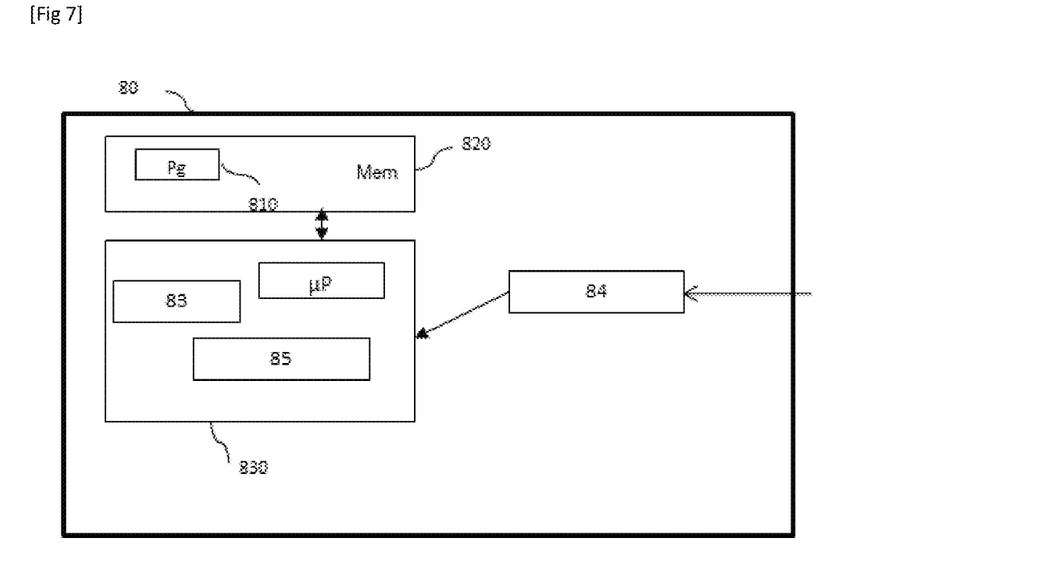
FIG. 7 shows one example of the structure of an allocation device according to one aspect of the invention.

FIG. 7 shows one example of the structure of an allocation device according to one aspect of the invention.

The allocation device 80 implements the allocation method in accordance with the various embodiments that have just been described.

Such a device 80 may be implemented in a device for managing a mobile network, such as an RRH device or an access station of a mobile network. The device may be implemented in any type of network in which resources and transmission features are allocated dynamically, independently of the generation of this network.

For example, the device 80 comprises a processing unit 830, equipped for example with a microprocessor μP, and driven by a computer program 810, stored in a memory 820 and implementing the allocation method according to the invention. On initialization, the code instructions of the computer program 810 are for example loaded into a RAM memory, before being executed by the processor of the processing unit 830.

Such a device 80 for allocating at least one transmission resource from among a plurality of resources, intended for the routing of a first item of data relating to a first application in a communication infrastructure, implemented for example in a DU entity 20 from FIGS. 5 and 6, comprises:

A receiver 84, able to receive, from a centralized management entity, an allocation message for allocating a plurality of resources comprising a set of transmission features for a second item of data relating to a second application, An assignment module 85, able to assign at least one resource of the plurality to the transmission of the first item of data, A selection module 83, able to select a feature of the set for the transmission of the second item of data on the resources of the plurality that are not assigned to the transmission of the first item of data.

The invention claimed is:

1. A method for allocating at least one transmission resource from among a plurality of resources, intended for routing a first item of data relating to a first application in a communication infrastructure, the method being implemented in a distributed management entity for managing the plurality of resources, and comprising:
- receiving, from a centralized management entity, an allocation message for allocating a plurality of resources comprising a set of transmission features for a second item of data relating to a second application;
- assigning at least one resource of the plurality of resources to a transmission of the first item of data; and
- selecting a feature from the set of transmission features for a transmission of the second item of data on resources of the plurality of resources that are not assigned to the transmission of the first item of data.

2. The method of claim 1, wherein the plurality of resources comprises a frequency band and a duration.

3. The method of claim 1, wherein the plurality of resources comprises a wavelength.

4. The method of claim 1, further comprising the distributed management entity obtaining a message comprising a parameter that triggers the assigning of the at least one resource.

5. The method of claim 4, wherein the parameter is obtained from a terminal.

6. The method of claim 1, further comprising, prior to the assigning, selecting a modulation and coding feature for the transmission of the second item of data.

7. The method of claim 1, wherein the set of transmission features, received by the distributed management entity, further comprises at least one item of priority information associated with at least one feature.

8. The method of claim 1, further comprising transmitting, to the centralized management entity, a notification message comprising an indication about the first item of data.

9. The method of claim 8, wherein the notification message comprises a forecast of resources for the transmission of the first item of data.

10. The method of claim 1, wherein the allocation message is received over a connection that multiplexes user data, control and resource synchronization channels.

11. The method of claim 1, wherein the allocation message further comprises an item of information about a network slice, called slice, associated with the plurality of resources.

12. A device for allocating at least one transmission resource from among a plurality of resources, intended for routing a first item of data relating to a first application in a communication infrastructure, the device comprising:
- a receiver configured to receive, from a centralized management entity, an allocation message for allocating a plurality of resources comprising a set of transmission features for a second item of data relating to a second application; and
- a processor configured to
assign at least one resource of the plurality of resources to a transmission of the first item of data, and to select a feature from the set of transmission features for a transmission of the second item of data on resources of the plurality of resources that are not assigned to the transmission of the first item of data.

13. A system for allocating at least one transmission resource from among a plurality of resources, intended for routing of a first item of data relating to a first application in a communication infrastructure, comprising:
- a distributed management entity comprising an allocation device for allocating at least one transmission resource front among a plurality of resources, intended for routing a first item of data relating to a first application in a communication infrastructure, the allocation device comprising:
  - a receiver configured to receive, from a centralized management entity, an allocation message for allocating a plurality of resources comprising a set of transmission features for a second item of data relating to a second application, and
  - a processor configured to
    - assign at least one resource of the plurality of resources to a transmission of the first item of data,
    - and to select a feature of the set of transmission features for a transmission of the second item of data on resources of the plurality of resources that are not assigned to the transmission of the first item of data; and
- the centralized management entity comprising:
  - a processor configured to
    - assign the plurality of resources comprising the set of transmission features to the transmission of the second item of data, and
  - a transmitter configured to transmit, to the distributed management entity, the allocation message for allocating the plurality of resources.

14. A non-transitory computer-readable recording medium on which a program is recorded which, when executed by a processor of an allocation device of a distributed management entity for managing a plurality of resources, configure the allocation device to implement a method for allocating at least one transmission resource from among the plurality of resources, intended for routing a first item of data relating to a first application in a communication infrastructure, the method comprising:
- receiving, from a centralized management entity, an allocation message for allocating a plurality of resources comprising a set of transmission features for a second item of data relating to a second application,
- assigning at least one resource of the plurality of resources to a transmission of the first item of data, and
- selecting a feature from the set of transmission features for a transmission of the second item of data on resources of the plurality of resources that are not assigned to the transmission of the first item of data.

* * * * *